United States Patent
Nagamochi et al.

(10) Patent No.: US 8,537,435 B2
(45) Date of Patent: Sep. 17, 2013

(54) IMAGE SCANNING APPARATUS AND IMAGE FORMING APPARATUS

(75) Inventors: Katsuya Nagamochi, Tokyo (JP); Naoaki Ide, Shizuoka-ken (JP); Mitsuru Hatano, Kanagawa-ken (JP); Sueo Ueno, Shizuoka-ken (JP); Hiroyuki Shiraishi, Shizuoka-ken (JP); Yusuke Hashizume, Chiba-ken (JP); Naoya Koseki, Shizuoka-ken (JP); Koji Shimokawa, Shizuoka-ken (JP); Jun Sakakibara, Tokyo (JP); Kenji Itagaki, Shizuoka-ken (JP); Sasuke Endo, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 219 days.

(21) Appl. No.: 13/110,701

(22) Filed: May 18, 2011

(65) Prior Publication Data
US 2011/0286057 A1 Nov. 24, 2011

Related U.S. Application Data

(60) Provisional application No. 61/346,387, filed on May 19, 2010, provisional application No. 61/346,391, filed on May 19, 2010, provisional application No. 61/346,397, filed on May 19, 2010, provisional application No. 61/346,401, filed on May 19, 2010, provisional application No. 61/346,404, filed on May 19, 2010, provisional application No. 61/346,407, filed on May 19, 2010.

(51) Int. Cl.
*H04N 1/04* (2006.01)

(52) U.S. Cl.
USPC .......................................... 358/484

(58) Field of Classification Search
USPC ................ 358/474, 475, 509, 484, 497, 496, 358/482, 483, 520, 515, 516, 512; 382/254, 382/274, 275
See application file for complete search history.

(56) References Cited

U.S. PATENT DOCUMENTS

| | | | | |
|---|---|---|---|---|
| 6,482,150 B2 * | 11/2002 | Utsui | ............................ | 600/178 |
| 6,509,954 B1 * | 1/2003 | Tanaka et al. | .................... | 355/53 |
| 6,753,840 B2 * | 6/2004 | Aoki | ............................... | 345/98 |
| 7,088,477 B2 * | 8/2006 | Koshimizu et al. | ........... | 358/487 |
| 7,339,189 B2 * | 3/2008 | Moriwaki | ........................ | 257/59 |
| 7,393,321 B2 * | 7/2008 | Doguchi et al. | .............. | 600/109 |
| 7,605,024 B2 * | 10/2009 | Moriwaki | ...................... | 438/149 |
| 7,889,228 B2 * | 2/2011 | Ishihara et al. | ................. | 348/65 |
| 2011/0012134 A1 * | 1/2011 | Takeuchi | ........................ | 257/82 |

FOREIGN PATENT DOCUMENTS

JP 2008-177918 7/2008

* cited by examiner

*Primary Examiner* — Negussie Worku
(74) *Attorney, Agent, or Firm* — Patterson & Sheridan, LLP

(57) ABSTRACT

According to one embodiment, an image scanning apparatus includes a document glass, a substrate, a first semiconductor light emitting element, a second semiconductor light emitting element, a light guiding section, and a light receiving section. The substrate is provided below and obliquely opposed to the document glass. The first semiconductor light emitting element is mounted on a first surface of the substrate opposed to the document glass and emits light to an original document via the document glass. The second semiconductor light emitting element is mounted on a second surface on the opposite side of the first surface and emits light. The light guiding section receives incidence of the light emitted from the second semiconductor light emitting element and emits the light to the original document from a position where a normal of the document glass is present between the light guide section and the first semiconductor light emitting element.

20 Claims, 19 Drawing Sheets

IMAGE SCANNING APPARATUS AND IMAGE FORMING APPARATUS

CROSS-REFERENCE TO RELATED APPLICATION

This application is based upon and claims the benefit of priority from U.S. provisional application 61/346,387, filed on May 19, 2010; U.S. provisional application 61/346,391, filed on May 19, 2010; U.S. provisional application 61/346,397, filed on May 19, 2010; U.S. provisional application 61/346,401, filed on May 19, 2010; U.S. provisional application 61/346,404, filed on May 19, 2010; and U.S. provisional application 61/346,407, filed on May 19, 2010; the entire contents of which are incorporated herein by reference.

FIELD

Embodiments described herein relate generally to a technique for irradiating light on an original document.

BACKGROUND

In the past, as an image scanning apparatus, there is known an image scanning apparatus that irradiates lights on an original document at the same incident angle from two light sources arranged across the perpendicular of a document glass. As each of the light sources, a light source mounted with a semiconductor light emitting element on a surface of a substrate opposed to the document glass is used. In the image scanning apparatus, when an original document having a level difference such as a bonded document is scanned, lights are irradiated on a level difference portion from both sides by the two light sources located across the level difference portion. Therefore, it is possible to prevent a shadow image from being generated in the level difference portion.

However, in the image scanning apparatus, a warp is caused in the substrate by heat of the semiconductor light emitting element mounted only on one side of the substrate. Since the two light sources are separately provided, costs increase.

DETAILED DESCRIPTION

In general, according to one embodiment, an image forming apparatus includes an image forming section configured to form an image read by a light receiving section on a sheet and an image scanning apparatus. The image scanning apparatus includes a document glass, a substrate, a first semiconductor light emitting element, a second semiconductor light emitting element, a light guiding section, and the light receiving section. An original document is placed on the document glass. The substrate is provided below the document glass and obliquely opposed to the document glass. The first semiconductor light emitting element is mounted on a first surface side of the substrate opposed to the document glass and emits light to the original document via the document glass. The second semiconductor light emitting element is mounted on a second surface on the opposite side of the first surface of the substrate and emits light. The light guiding section receives incidence of the light emitted from the second semiconductor light emitting element and emits the light to the original document from a position where a normal of the document glass, which passes an irradiated point of the original document by the first semiconductor light emitting element, is present between the light guiding section and the first semiconductor light emitting element. The light receiving section receives the lights emitted from the first and second semiconductor light emitting elements and reflected on the original document.

Embodiments are explained below with reference to the accompanying drawings.

First Embodiment

Figure 1:
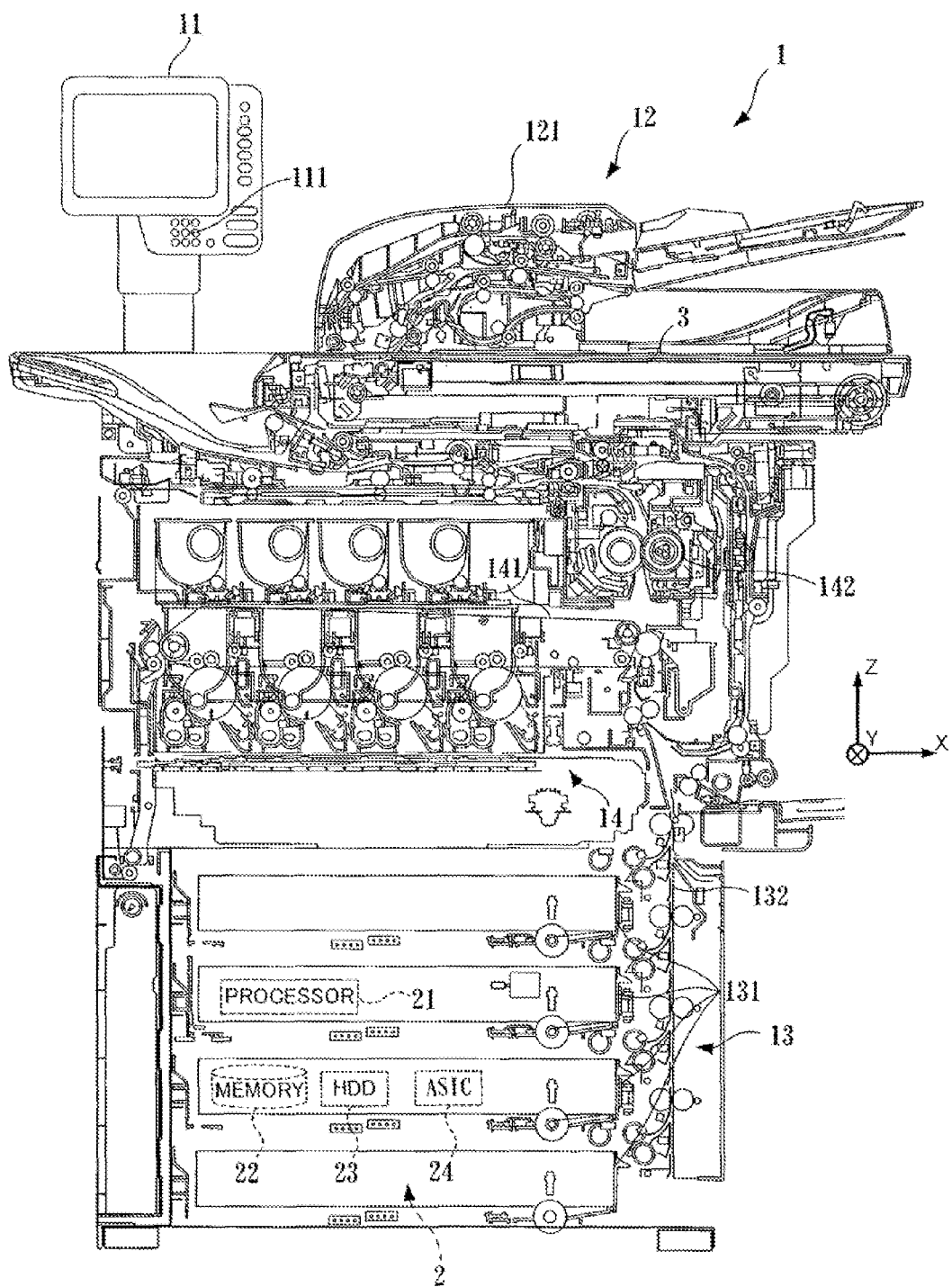
FIG. 1 is a diagram of the configuration of an image forming apparatus.

FIG. 1 is a diagram of the configuration of an image forming apparatus 1.

The image forming apparatus 1 is a MFP (Multi Function Peripheral). The image forming apparatus 1 includes a control section 2, a display section 11, an image reading section 12, a sheet feeding section 13, and an image forming section 14. The control section 2 includes a processor 21, a memory 22, a HDD (Hard Disk Drive) 23, and an ASIC (Application Specific Integrated Circuit) 24 and controls the entire image forming apparatus 1. The display section 11 includes an operation input section 111 for receiving an operation input. The display section 11 displays setting and the like of the image forming apparatus 1 and receives the operation input. The image reading section 12 includes a reading section 3 configured to read an original document and an ADF (Auto Document Feeder) 121 configured to cause a sheet to pass through the reading section 3. The sheet feeding section 13 includes paper feeding cassettes 131 configured to store sheets and a conveying path 132 for conveying a sheet picked up from the paper feeding cassettes 131 to the image forming section 14. The image forming section 14 includes a transfer belt 141 configured to transfer a toner image onto the sheet conveyed from the sheet feeding section 13 and a fixing device 142 configured to heat and press the sheet and fix the toner image on the sheet.

Figure 2:
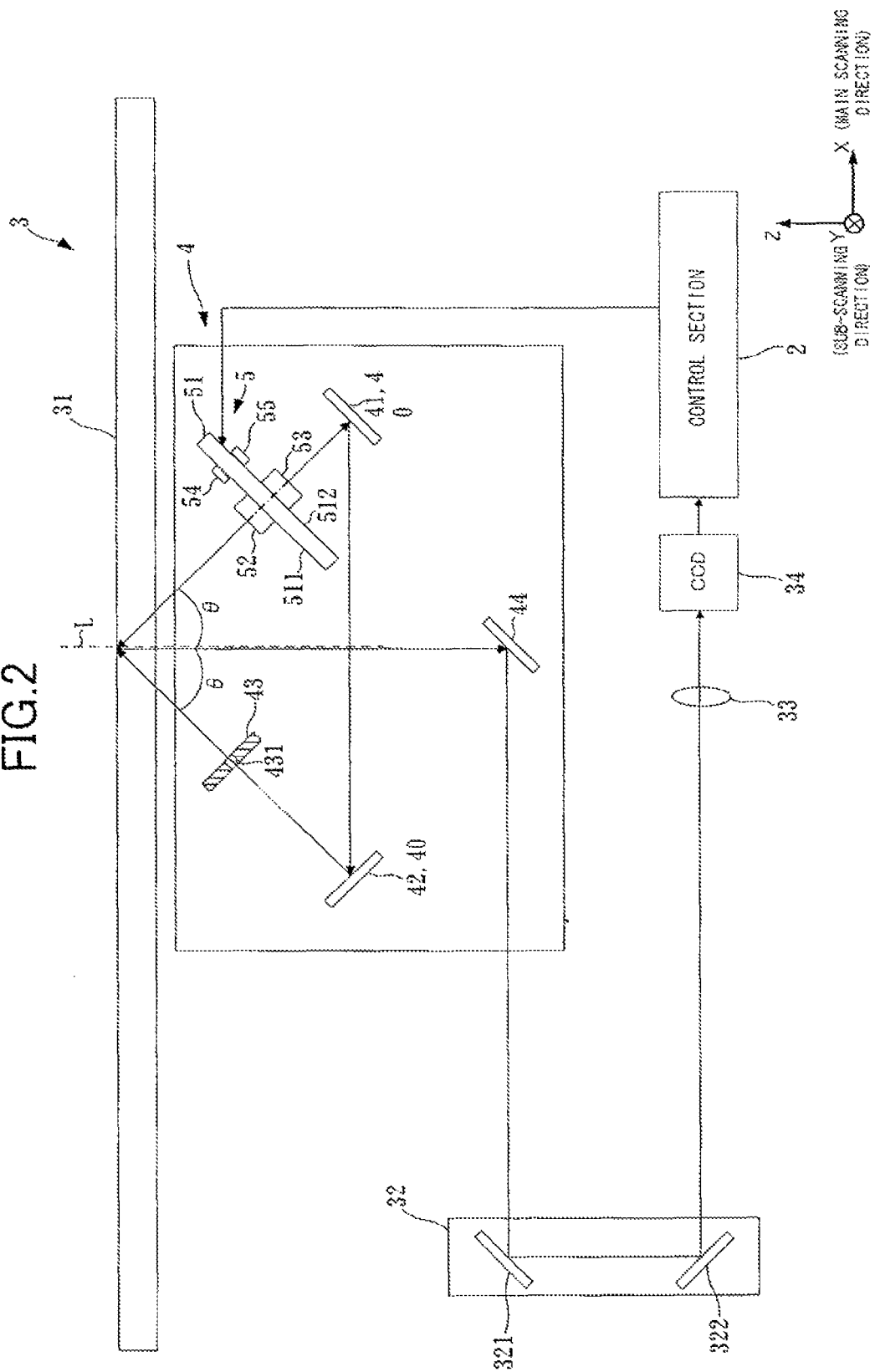
FIG. 2 is a schematic diagram of a reading section.

FIG. 2 is a schematic diagram of the reading section 3.

The reading section 3 includes a document glass 31, a first carriage 4, a second carriage 32 (a mirror group), a focusing lens 33, a CCD unit (Charge Coupled Device Image Sensor Unit) 34 (a light receiving section), and the control section 2.

An original document is placed on the document glass 31. The left side in FIG. 2 of the document glass 31 is through-read glass.

When the reading section 3 reads the original document on the document glass 31, the first carriage 4 irradiates light on the original document while moving in the right direction in FIG. 2 and reflects reflected light from the original document to the second carriage 32 side. In FIG. 2, the left-right direction as a moving direction of the first carriage 4 is set as main scanning direction and a depth direction on paper surface orthogonal to the main scanning direction is set as sub-scanning direction. In FIG. 2, the right direction in FIG. 2 in which the first carriage 4 travels when the reading section 3 reads the original document on the document glass 31 is set as the distal end side in the main scanning direction. In FIG. 2, the left direction in FIG. 2 on an initial position side of the first carriage 4 is set as the proximal end side in the main scanning direction. When the reading section 3 reads an original document fed by the ADF 121, the first carriage 4 is present on the proximal end side in the main scanning direction and below the through-read glass and irradiates light on the document in an immovable state.

The first carriage 4 includes a light source unit 5, a first reflector 41, a second reflector 42, an aperture 43, and a first mirror 44. The members 5 and 41 to 43 integrally move. Moving speed of the first carriage 4 in scanning a color document is a half of moving speed in scanning a monochrome document.

The light source unit 5 includes a substrate 51, a pseudo white LED (Light Emitting Diode) 52 (a first semiconductor light emitting element), an interpolation LED 53 (a second semiconductor light emitting element), a first sensor 54, and a second sensor 55.

The substrate 51 is provided below the document glass 31 and obliquely opposed to the document glass 31.

Figure 3:
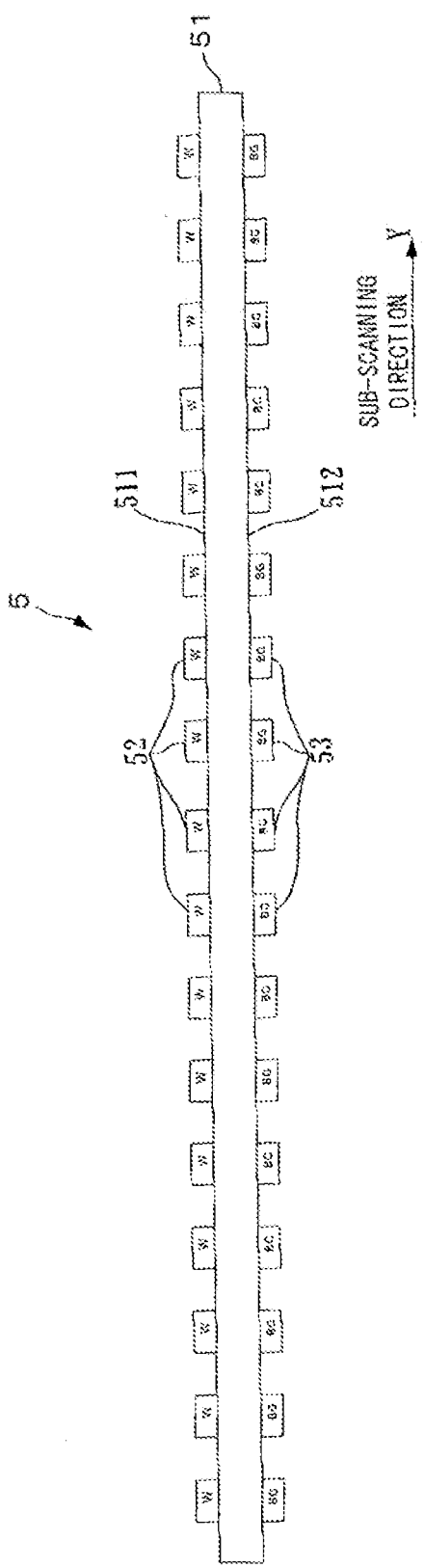
FIG. 3 is an enlarged diagram of an array in a sub-scanning direction of pseudo white LEDs.

FIG. 3 is an enlarged diagram of an array in the sub-scanning direction (the depth direction of paper surface of FIG. 2) of the pseudo white LED 52.

Plural pseudo white LEDs 52 are mounted on a first surface 511 side of the substrate 51 opposed to the document glass 31 and emit lights to an original document via the document glass 31. The pseudo white LEDs 52 are linearly provided via a fixed gap in the sub-scanning direction on the substrate 51.

Figure 4:
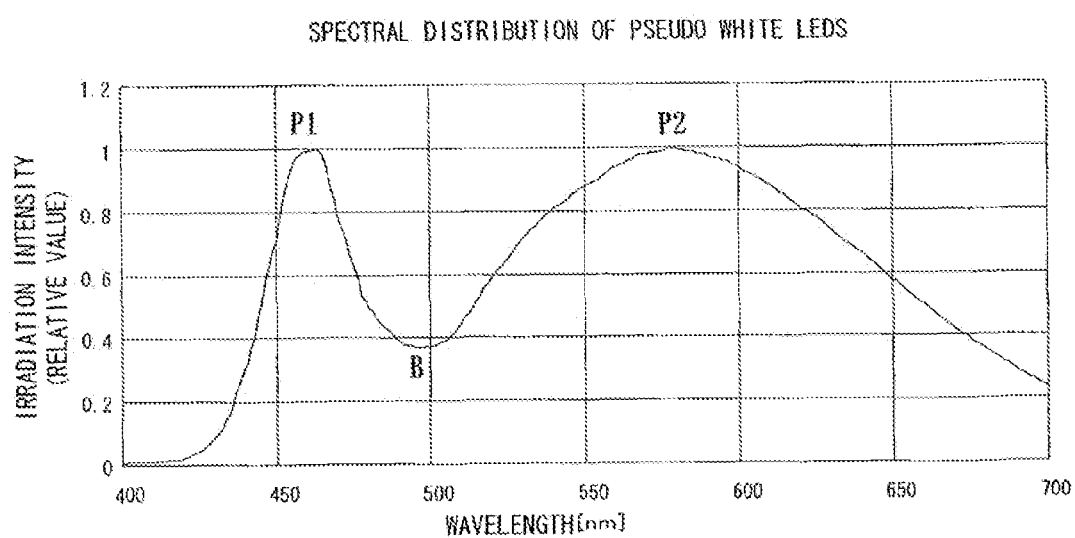
FIG. 4 is a graph of the spectral distribution of the pseudo white LEDs.

FIG. 4 is a graph of the spectral distribution of the pseudo white LEDs 52.

The pseudo white LEDs 52 have, in the spectral distribution in a visible light region having wavelength of 400 nm to 700 nm, a first peak P1 (a first semiconductor peak) present in a blue wavelength region of 450 nm to 485 nm and a second peak P2 (a first semiconductor peak) present in a yellowish green wavelength region of 550 nm to 595 nm and emit pseudo white lights. A person has SML pyramids having high sensitivity in BGR regions. Among the SML pyramids, in an ML pyramid having high sensitivity in a GR region, wavelength regions having high sensitivity substantially overlap each other. Therefore, the person feels as if light having intense wavelength near 555 nm is bright even if energy of the light is small. The pseudo white LEDs 52 include blue light emitting diodes that emit lights having the first peak P1 present in the blue wavelength region and phosphors that emit lights having the second peak P2 present in the yellowish green wavelength region having high luminous efficiency. The pseudo white LEDs 52 emit pseudo white lights extremely bright in terms of eyesight. In this way, since the pseudo white LEDs 52 emit the pseudo white lights extremely bright in terms of eyesight with small energy, the pseudo white LEDs 52 have high universality and are circulated in the market. The pseudo white LEDs 52 have a bottom B portion having a small light amount between the two peaks P1 and P2.

Figure 5:
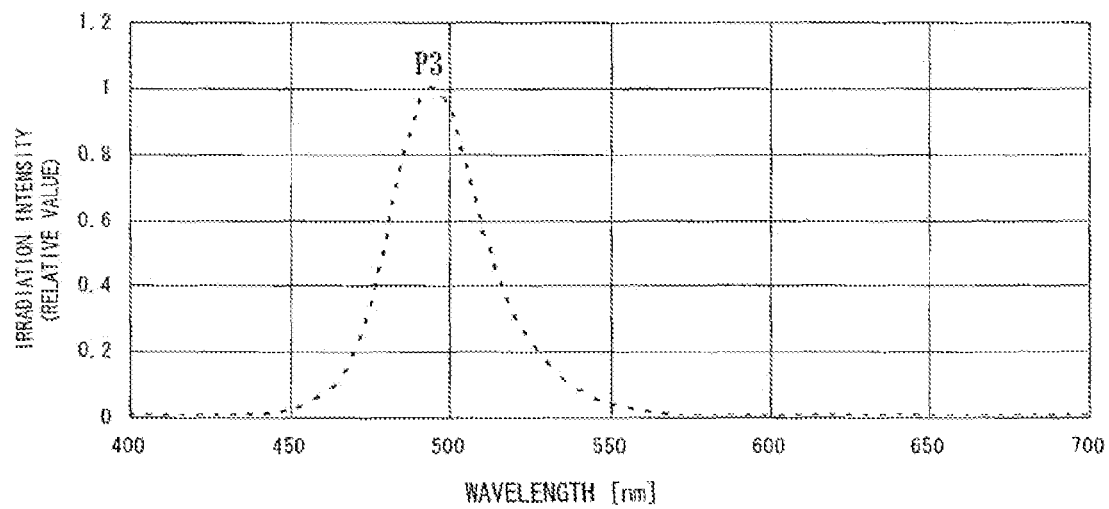
FIG. 5 is a graph of the spectral distribution of interpolation LEDs.

Plural interpolation LEDs 53 are mounted on a second surface 512 (FIG. 2) on the opposite side of the first surface 511 of the substrate 51. As shown in FIG. 5, emitted lights of the interpolation LEDs 53 have, in the spectral distribution in a visible light region, a third peak P3 (a second semiconductor peak) located between the two peaks P1 and P2 in a wavelength region shifted from the peaks P1 and P2 of the pseudo white LEDs 52, i.e., a wavelength region of 501 nm to 550 nm. The interpolation LEDs 53 emit green lights for interpolating the wavelength region of the emitted lights of the pseudo white LEDs 52.

Figure 6:
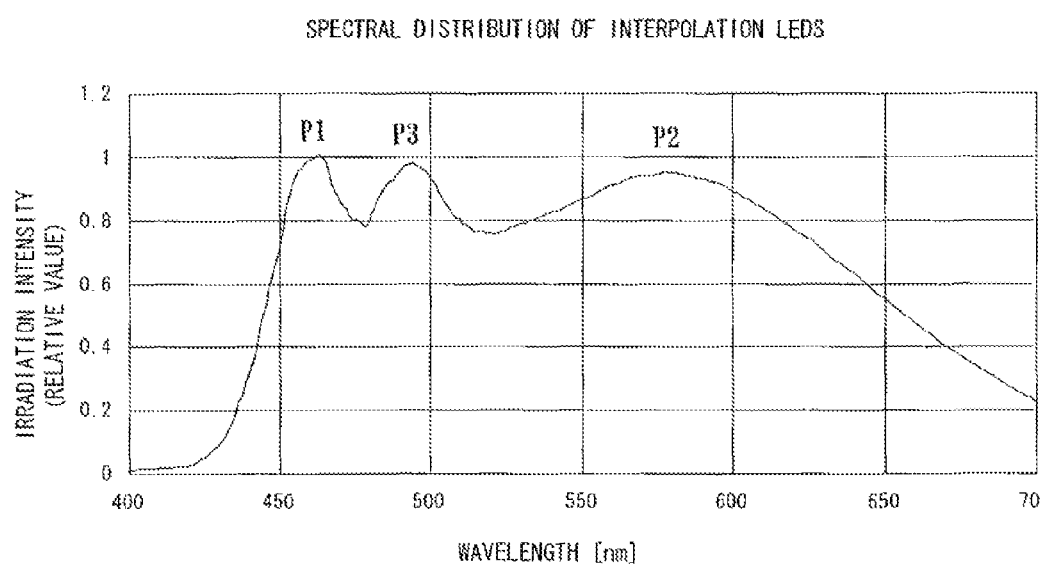
FIG. 6 is a graph of the spectral distribution of combined light.

Consequently, when the emitted lights of the pseudo white LEDs 52 and the emitted lights of the interpolation LEDs 53 are combined, as shown in FIG. 6, the spectral distribution of the combined light is a distribution in which a light amount of the bottom B portion between the peaks P1 and P2 increases and intensity is flat. If an original document is scanned with the lights before the combination having an insufficient light amount of the bottom B portion, a signal level decreases in the wavelength region of the bottom B portion and an image with large noise is formed. However, in this embodiment, since an original document is scanned with the combined light having the increased light amount of the bottom B portion between the peaks P1 and P2, the signal level in the wavelength region of the bottom B portion can be increased and a satisfactory image with little noise can be obtained.

The interpolation LEDs 53 are provided right behind the pseudo white LEDs 52 on the second surface 512 of the substrate 51 (FIG. 3). In this way, in this embodiment, the LEDs provided on the separate substrates and on the one surfaces of the substrates in the past are provided on both the surfaces 511 and 512 of the one substrate 51. Therefore, it is possible to prevent only the one surface of the substrate from being heated and prevent a warp of the substrate. In this embodiment, the LEDs provided on the separate substrates in the past are provided on the one substrate 51. Therefore, it is possible to reduce costs. The interpolation LEDs 53 do not have to be provided right behind the pseudo white LEDs 52 on the substrate 51 and may be provided right behind gap portions among the pseudo white LEDs 52.

Referring back to FIG. 2, the first sensor 54 is, for example, a diode mounted on the first surface 511 of the substrate 51. The first sensor 54 detects the temperature on the first surface 511 side of the substrate 51 and outputs a detection signal to the control section 2.

The second sensor 55 is, for example, a diode mounted on the second surface 512 of the substrate 51. The second sensor 55 detects the temperature on the second surface 512 side of the substrate 51 and outputs a detection signal to the control section 2.

The first reflector 41 is opposed to the second surface 512 of the substrate 51 and reflects lights emitted from the interpolation LEDs 53.

The second reflector 42 reflects the lights, which are reflected by the first reflector 41, to the original document from a position where a normal L of the document glass 31, which passes an irradiated point of the original document by the pseudo white LEDs 52, is present between the second reflector 42 and the pseudo white LEDs 52. The second reflector 42 is set in a posture where an incident angle θ of the reflected lights made incident on the original document is equal to an incident angle θ of the lights emitted from the pseudo white LEDs 52 made incident on the original document.

In this embodiment, a light guiding section 40 includes the first reflector 41 and the second reflector 42. The light guiding section 40 receives incidence of lights emitted from the interpolation LEDs 53 and emits the lights to the original document from the position where the normal L of the document glass 31, which passes the irradiated point of the original document by the pseudo white LEDs 52, is present between the light guiding section 40 and the pseudo white LEDs 52. In this way, in this embodiment, the original document is irradiated from both sides. Therefore, even if there is a level difference such as a bonded portion in the original document, it is possible to prevent a shadow image from being generated.

The aperture 43 is present between the second reflector 42 and the document glass 31. A slit 431 is formed in the aperture 43. The aperture 43 shapes, through the slit 431, the reflected lights from the second reflector 42.

The first mirror 44 reflects, to the second carriage 32 side, combined light of the lights emitted from the pseudo white LEDs 52 and reflected on the original document and the lights emitted from the interpolation LEDs 53 and then guided to the original document by the reflectors 41 and 42 and reflected on the original document.

The second carriage 32 includes a second mirror 321 and a third mirror 322. The second carriage 32 moves in the main scanning direction at half speed of the first carriage 4 in association with the first carriage 4. The second carriage 32 reflects the lights, which are reflected by the first mirror 44, to the CCD unit 34 side with the mirrors 321 and 322.

The CCD unit 34 receives the lights, which are reflected by the second carriage 32, via the focusing lens 33. The CCD unit 34 has a configuration in which light receiving elements are arranged in four lines. Three lines among the four lines are lines for reading a color document and are covered with color filters for RGB. One line among the four lines is a line for reading a monochrome document and is not covered with a filter.

Figure 7:
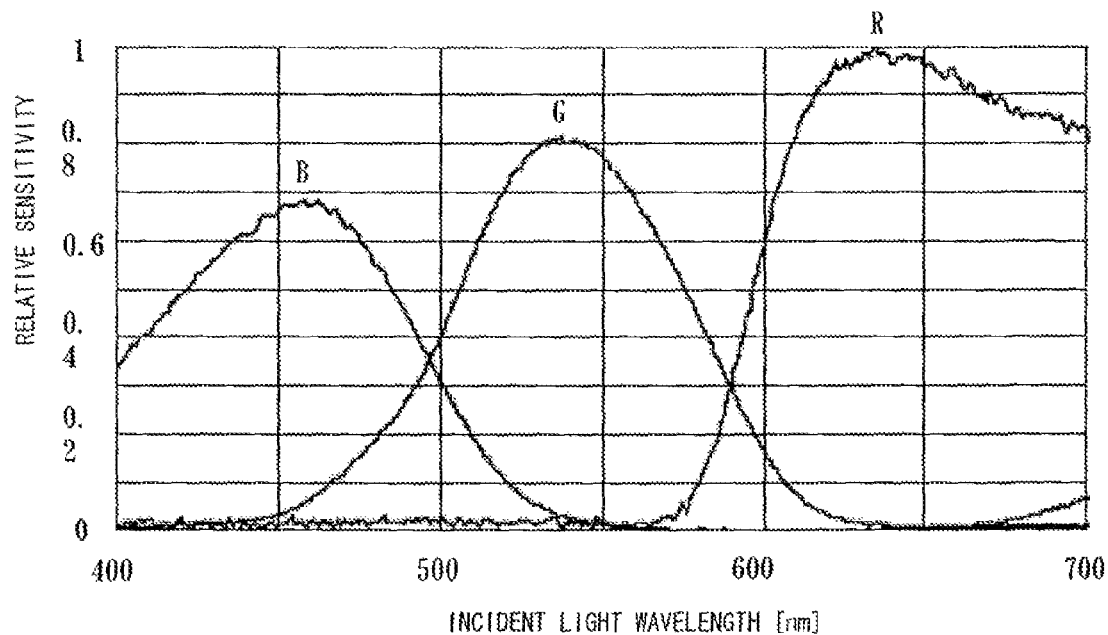
FIG. 7 is a graph of the spectral sensitivity of light receiving elements of RGB lines.

FIG. 7 is a graph of the spectral sensitivity of the light receiving elements of the RGB lines in the CCD unit 34.

The light receiving elements of the RGB lines in the CCD unit 34 read light amounts of lights having wavelengths passing through the RGB filters. For example, the light receiving element of the R line reads a light amount in a wavelength region of 560 nm to 700 nm or over.

The control section 2 separately controls the pseudo white LEDs 52 and the interpolation LEDs 53 and controls light amounts of the LEDs 52 and 53. Specifically, the control section 2 controls, on the basis of detection signals from the sensors 54 and 55, the light amounts of the pseudo white LEDs 52 and the interpolation LEDs 53 to equalize the temperatures of the first and second surfaces 511 and 512 of the substrate 51.

Since the interpolation LEDs 53 emit lights in a narrower wavelength region than the pseudo white LEDs 52, if the interpolation LEDs 53 output lights having intensity same as that of the pseudo white LEDs 52, a heat quantity generated from the interpolation LEDs 53 is smaller than a heat quantity generated from the pseudo white LEDs 52. Therefore, in the case of a configuration for simply controlling the interpolation LEDs 53 to equalize the heat quantity generated from the interpolation LEDs 53 with the heat quantity generated from the pseudo white LEDs 52, it is likely that the light amount of the interpolation LEDs 53 excessively increases and a balance of combined light is lost.

However, in this embodiment, an optical path length between the interpolation LEDs 53 and the original document is long compared with an optical path length between the pseudo white LEDs 52 and the original document. Therefore, since the optical path length between the interpolation LEDs 53 and the original document is long, it is possible to reduce the intensity of the lights emitted from the interpolation LEDs 53. When the interpolation LEDs 53 are controlled to equalize the heat quantity generated from the interpolation LEDs 53 with the heat quantity generated from the pseudo white LEDs 52, the intensity of the lights from the interpolation LEDs 53 irradiated on the original document and the intensity of the lights from the pseudo white LEDs 52 can be equalized.

Second Embodiment

In a second embodiment explained below, components having functions same as those in the first embodiment are denoted by the same reference numerals and signs and explanation of the components is omitted.

Figure 8:
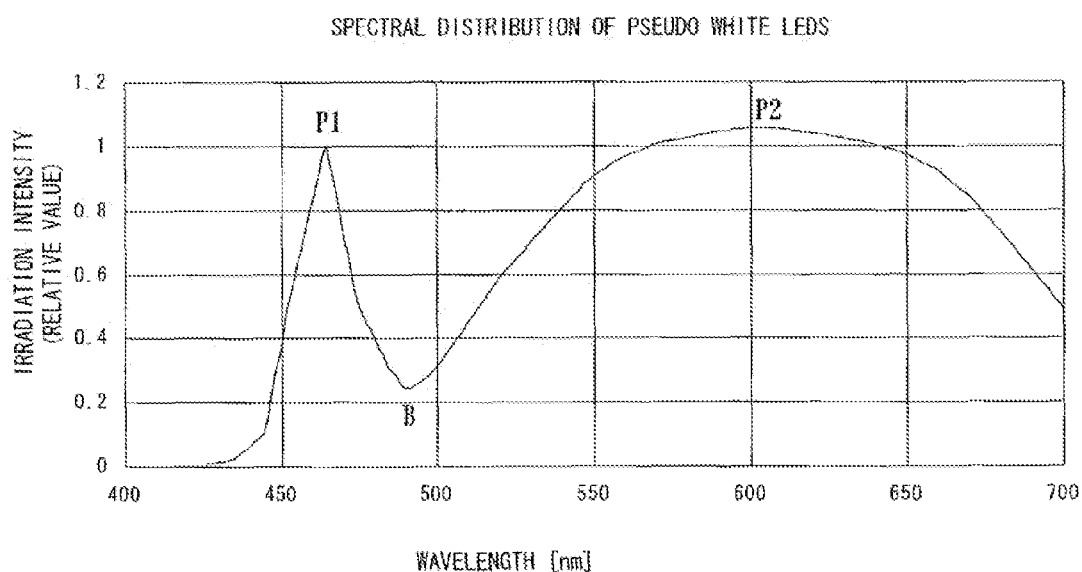
FIG. 8 is a graph of the spectral distribution of pseudo white LEDs.
Figure 9:
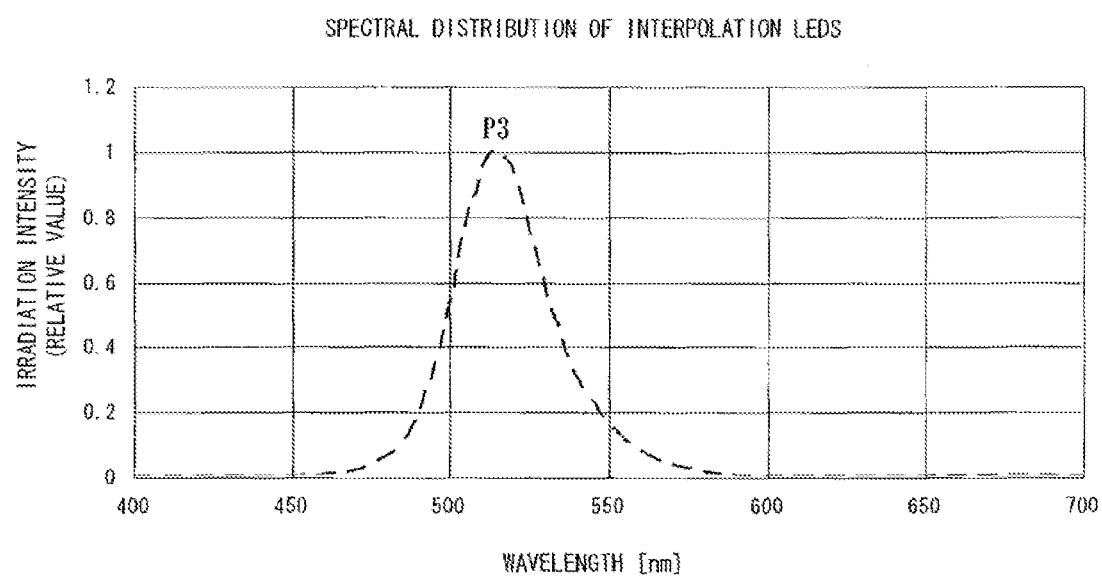
FIG. 9 is a graph of the spectral distribution of interpolation LEDs.
Figure 10:
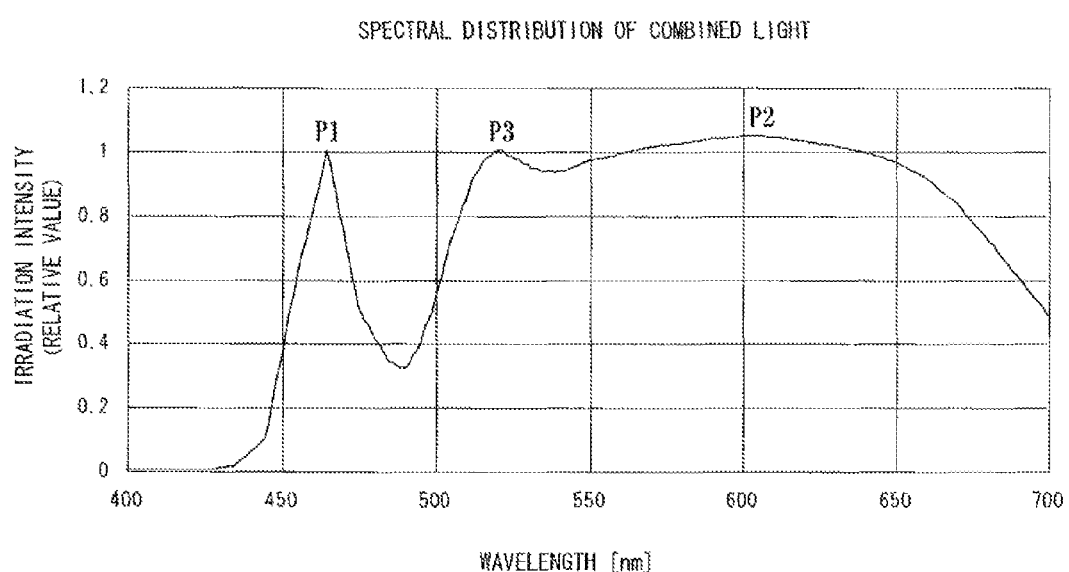
FIG. 10 is a graph of the spectral distribution of combined light.

FIG. 8 is a graph of the spectral distribution of pseudo white LEDs. FIG. 9 is a graph of the spectral distribution of interpolation LEDs. FIG. 10 is a graph of the spectral distribution of combined light.

This embodiment is different from the first embodiment in the spectral distributions of the LEDs. The pseudo white LEDs have, in the spectral distribution of visible light, a first peak P1 present in a blue wavelength region of 450 nm to 485 nm and a second peak P2 present in an orange wavelength region of 600 nm to 625 nm. The interpolation LEDs have a third peak P3 present in a green wavelength region of 501 nm to 550 nm. In this embodiment, as in the first embodiment, in the spectral distribution of the combined light, it is possible to make the intensity of light flat and reduce noise of an image, although a bottom portion where the intensity partially falls remains. In this embodiment, as in the first embodiment, since the LEDs are provided on both surfaces of a substrate, it is possible to prevent a warp of the substrate.

Third Embodiment

Figure 11:
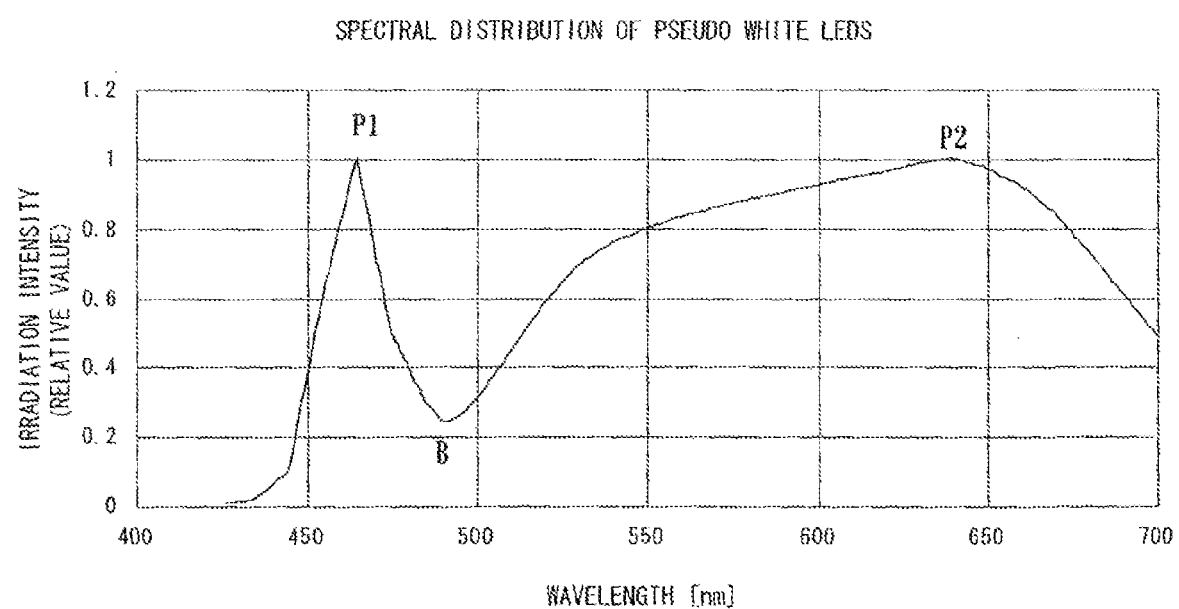
FIG. 11 is a graph of the spectral distribution of pseudo white LEDs.
Figure 12:
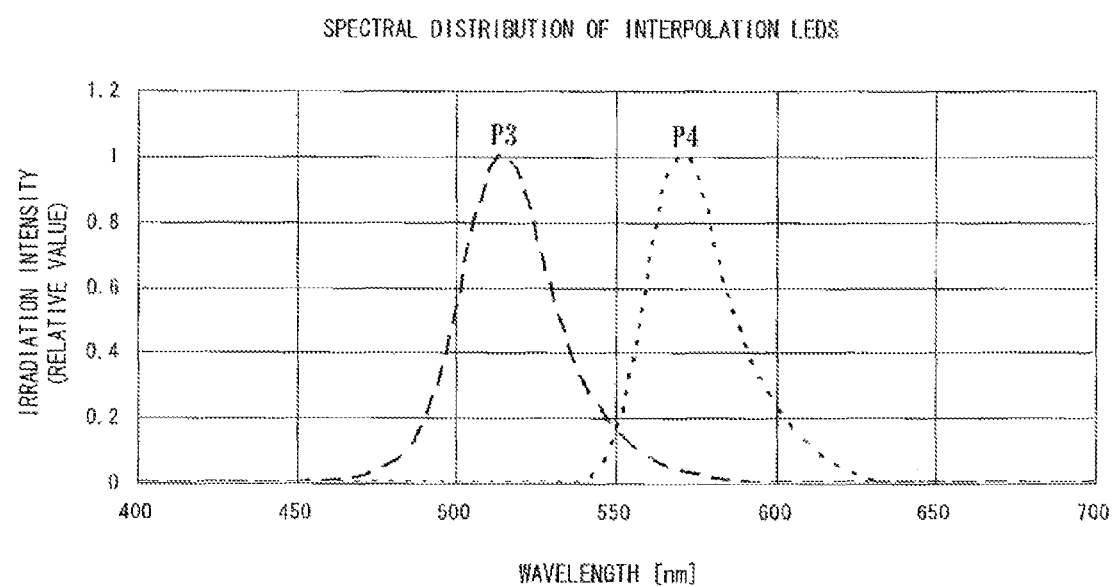
FIG. 12 is a graph of the spectral distribution of interpolation LEDs.
Figure 13:
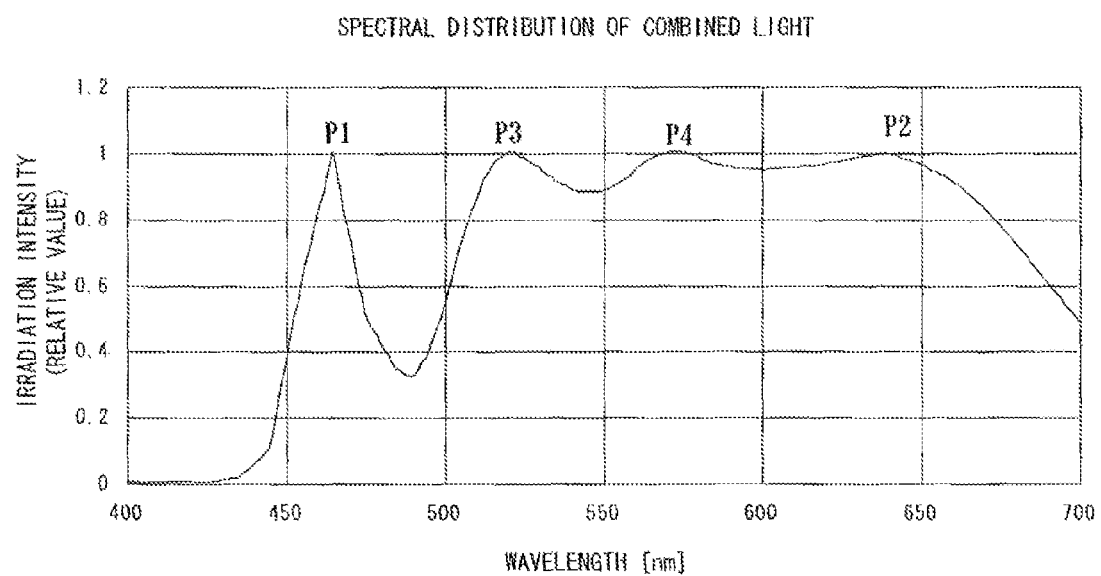
FIG. 13 is a graph of the spectral distribution of combined light.

FIG. 11 is a diagram of the spectral distribution of pseudo white LEDs. FIG. 12 is a diagram of the spectral distribution of interpolation LEDs. FIG. 13 is a diagram of the spectral distribution of combined light.

In a third embodiment, the pseudo white LEDs have, in the spectral distribution of visible light, a first peak P1 present in a blue wavelength region of 450 nm to 485 nm and a second peak P2 present in a red wavelength region of 625 nm to 700 nm. There are two peaks in a visible light region of the interpolation LEDs. Both the two peaks are present between the peaks P1 and P2 of the pseudo white LEDs. The interpolation LEDs arranged right behind the pseudo white LEDs on a substrate include LEDs that emit green lights and LEDs that emit yellowish green lights. The interpolation LEDs have, in the spectral distribution of the visible light, a third peak P3 present in a green wavelength region of 500 nm to 550 nm and a fourth peak P4 present in a yellowish green wavelength region of 550 nm to 580 nm.

Fourth Embodiment

Figure 14:
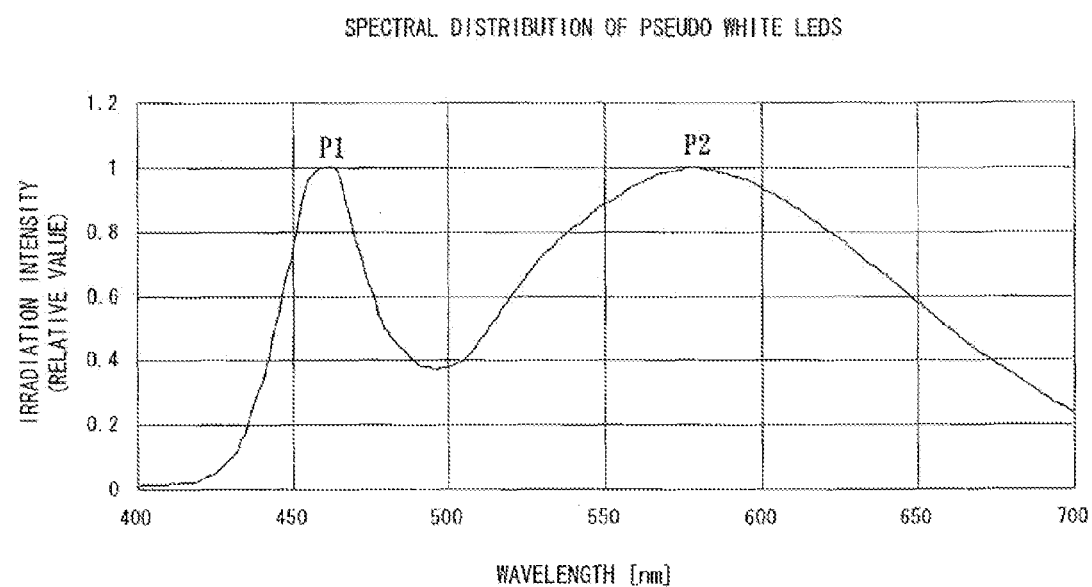
FIG. 14 is a graph of the spectral distribution of pseudo white LEDs.
Figure 15:
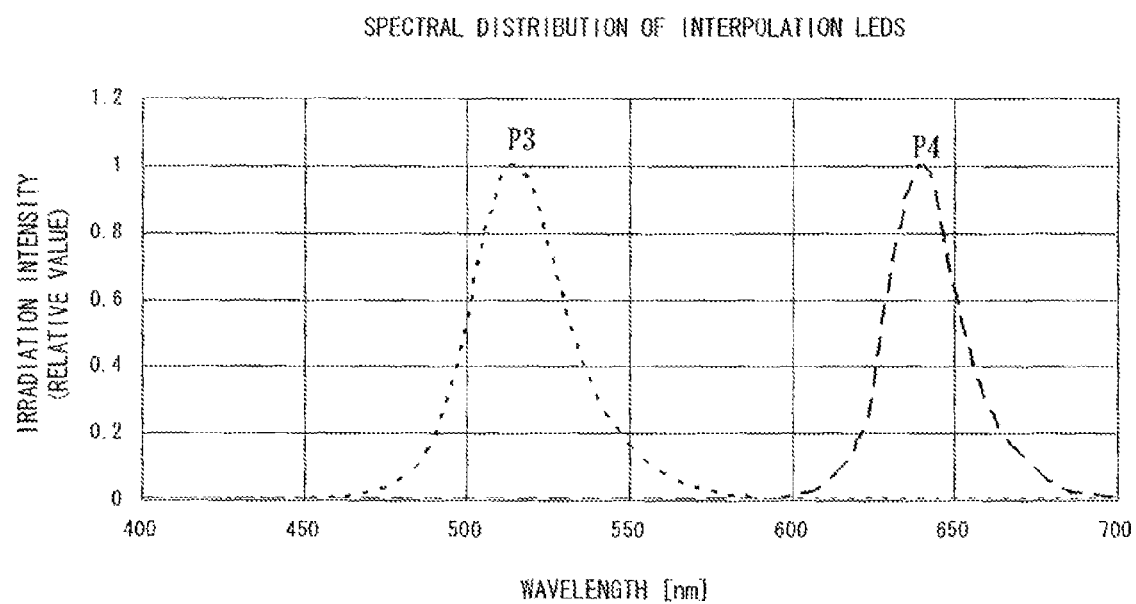
FIG. 15 is a graph of the spectral distribution of interpolation LEDs.
Figure 16:
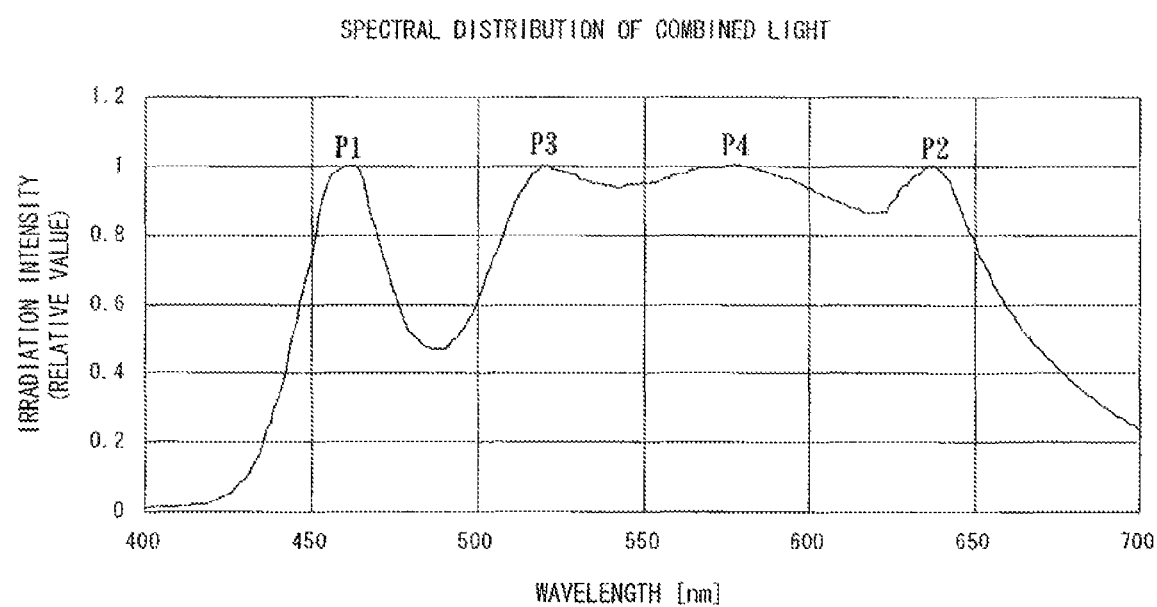
FIG. 16 is a graph of the spectral distribution of combined light.

FIG. 14 is a graph of the spectral distribution of pseudo white LEDs. FIG. 15 is a graph of the spectral distribution of interpolation LEDs. FIG. 16 is a diagram of the spectral distribution of combined light.

In a fourth embodiment, the pseudo white LEDs have, in the spectral distribution of visible light, a first peak P1 present in a blue wavelength region of 450 nm to 485 nm and a second peak P2 present in a yellowish green wavelength region of 550 nm to 600 nm. There are two peaks P3 and P4 of the interpolation LEDs. One of the two peaks P3 and P4 is present between the peaks P1 and P2 of the pseudo white LEDs. The other is present in a wavelength region higher than the peaks P1 and P2 of the pseudo white LEDs. The interpolation LEDs have, in the spectral distribution of the visible light, a third peak P3 present in a green wavelength region of 500 nm to 540 nm and a fourth peak P4 present in a red wavelength region of 610 nm to 660 nm.

Fifth Embodiment

Figure 17:
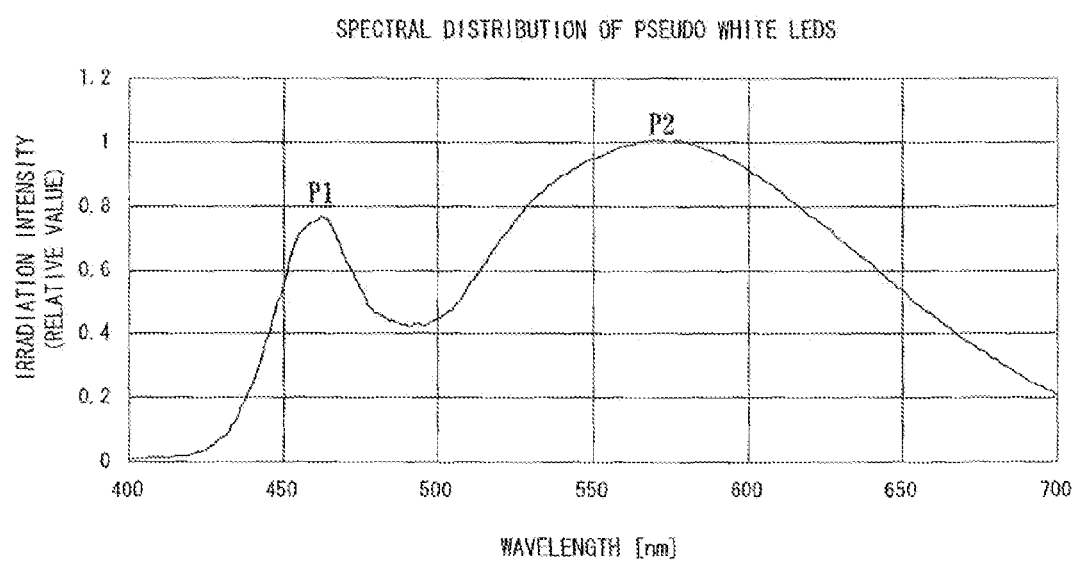
FIG. 17 is a graph of the spectral distribution of pseudo white LEDs.
Figure 18:
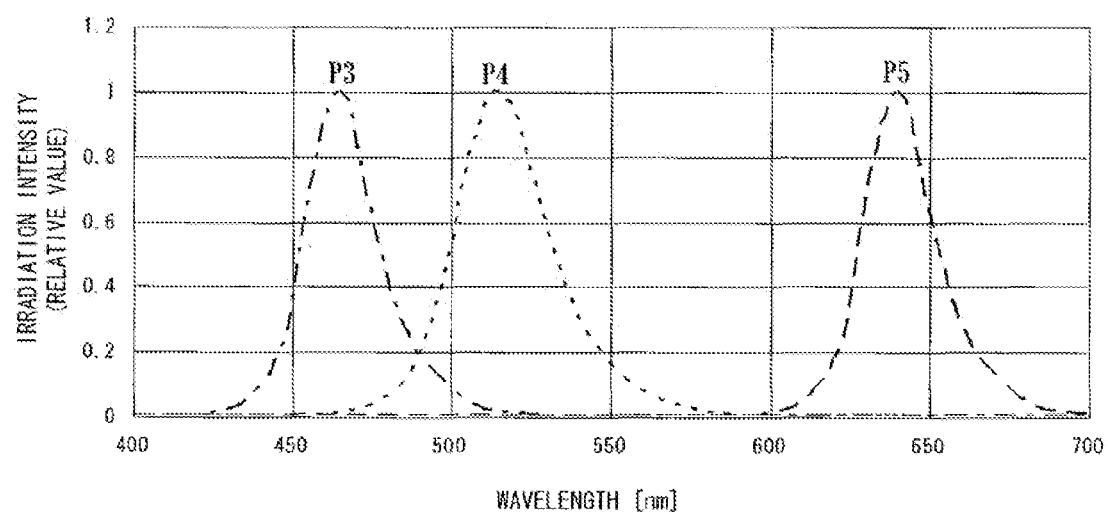
FIG. 18 is a graph of the spectral distribution of interpolation LEDs.
Figure 19:
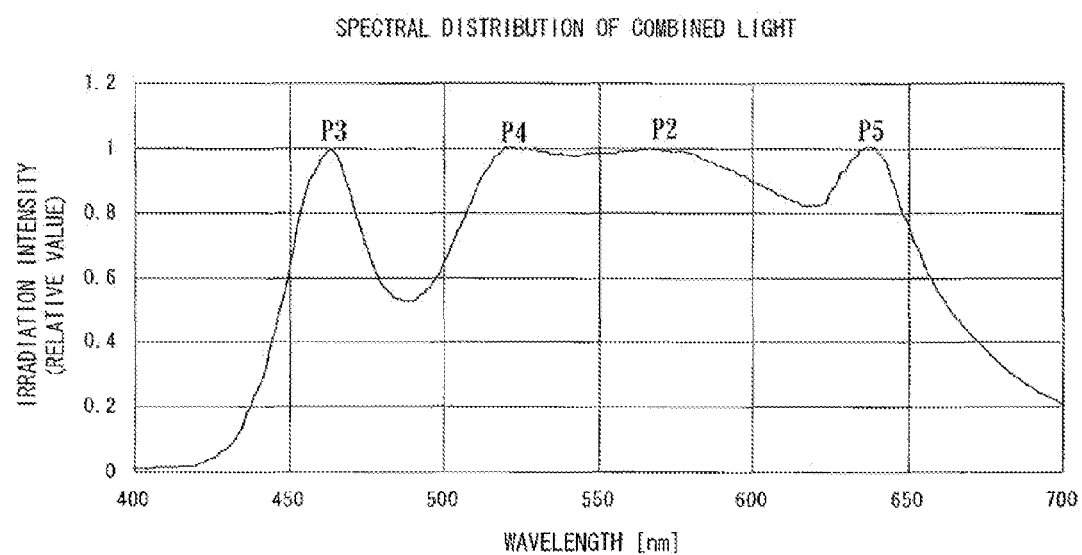
FIG. 19 is a graph of the spectral distribution of combined light.

FIG. 17 is a graph of the spectral distribution of pseudo white LEDs. FIG. 18 is a graph of the spectral distribution of interpolation LEDs. FIG. 19 is a graph of the spectral distribution of combined light.

In a fifth embodiment, the pseudo white LEDs have, in the spectral distribution of visible light, a first peak P1 present in a blue wavelength region of 450 nm to 485 nm and a second peak P2 present in a yellowish green wavelength region of 550 nm to 600 nm. The intensity of the second peak P2 is higher than the intensity of the first peak P1. There are three peaks P3 to P5 of the interpolation LEDs. One of the three peaks P3 to P5 overlaps the first peak P1 present in a lower wavelength region of the two peaks P1 and P2 of the pseudo white LEDs. Another one of the three peaks P3 to P5 is present between the peaks P1 and P2 of the pseudo white LEDs. Still another one of the three peaks P3 to P5 is present in a wavelength region higher than the peaks P1 and P2 of the pseudo white LEDs. The interpolation LEDs have, in the spectral distribution of the visible light, a third peak P3 present in the blue wavelength region of 450 nm to 485 nm, a fourth peak P4 present in a green wavelength region of 500 nm to 540 nm, and a fifth peak P5 present in a red wavelength region of 610 nm to 660 nm.

As explained above in detail, according to the technique described in this specification, it is possible to provide a technique for irradiating light on an original document.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. An image scanning apparatus comprising:
a document glass on which a document is to be placed;
a substrate provided below the document glass and having first and second surfaces that are at an oblique angle with respect to the document glass, the first surface facing the document glass and the second surface being opposite the first surface and facing away from the document glass;
a first semiconductor light emitting element disposed on the first surface and configured to emit light in a direction towards the document glass;
a second semiconductor light emitting element disposed on the second surface and configured to emit light in a direction away from the document glass;
a light guiding section configured to receive light emitted from the second semiconductor light emitting element and direct the received light towards the document glass; and a light receiving section configured to receive light emitted from the first and second semiconductor light emitting elements that has been reflected from the document.

2. The apparatus according to claim 1, wherein
the first semiconductor light emitting element has a spectral distribution in a visible light region with plural first semiconductor peaks, and
the second semiconductor light emitting element has a spectral distribution in a visible light region with a second semiconductor peak that is shifted from the first semiconductor peaks.

3. The apparatus according to claim 2, wherein there is a single second semiconductor peak and the single second semiconductor peak is present between first semiconductor peaks.

4. The apparatus according to claim 3, wherein
the spectral distribution of the first semiconductor light emitting element has a first peak present in a wavelength region of 450 nm to 485 nm and a second peak present in a wavelength region of 550 nm to 595 nm and emits pseudo white light, and
the second semiconductor peak is present in a wavelength region of 490 nm to 500 nm.

5. The apparatus according to claim 3, wherein
the spectral distribution of the first semiconductor light emitting element has a first peak present in a wavelength region of 450 nm to 485 nm and a second peak present in an wavelength region of 600 nm to 625 nm and emits pseudo white light, and
the second semiconductor peak is present in a wavelength region of 501 nm to 550 nm.

6. The apparatus according to claim 2, wherein there are a pair of the first semiconductor peaks, there are a pair of the second semiconductor peaks, and the pair of the second semiconductor peaks are present between the pair of the first semiconductor peaks.

7. The apparatus according to claim 6, wherein
the spectral distribution of the first semiconductor light emitting element has a first peak present in a wavelength region of 450 nm to 485 nm and a second peak present in a wavelength region of 625 nm to 700 nm and emits pseudo white light, and
the second semiconductor light emitting element has a third peak present in a wavelength region of 500 nm to 550 nm and a fourth peak present in a wavelength region of 550 nm to 580 nm.

8. The apparatus according to claim 2, wherein there are a pair of the first semiconductor peaks, there are a pair of the second semiconductor peaks, and one of the pair of second semiconductor peaks is present between the pair of the first semiconductor peaks and the other of the pair of the second semiconductor peaks is present in a wavelength region that is higher than a wavelength region of both of the pair of the first semiconductor peaks.

9. The apparatus according to claim 8, wherein
the spectral distribution of the first semiconductor light emitting element has a first peak present in a wavelength region of 450 nm to 485 nm and a second peak present in a wavelength region of 550 nm to 600 nm and emits pseudo white light, and
the second semiconductor light emitting element has a third peak present in a wavelength region of 500 nm to 540 nm and a fourth peak present in a wavelength region of 610 nm to 660 nm.

10. The apparatus according to claim 2, wherein there are a pair of the first semiconductor peaks, there are a trio of the second semiconductor peaks, and one of the trio of second semiconductor peaks overlaps one of the pair of the first semiconductor peaks that is present in a lower wavelength region than the other of the pair of first semiconductor peaks, another one of the trio of the second semiconductor peaks is present in a wavelength region between the pair of the first semiconductor peaks, and still another one of the trio of the second semiconductor peaks is present in a wavelength region that is higher than the pair of the first semiconductor peaks.

11. The apparatus according to claim 10, wherein
the spectral distribution of the first semiconductor light emitting element has a first peak present in a wavelength region of 450 nm to 485 nm and a second peak present in a wavelength region of 550 nm to 600 nm and emits pseudo white light, and
the second semiconductor light emitting element has a third peak present in the wavelength region of 450 nm to 485 nm, a fourth peak present in a wavelength region of 500 nm to 540 nm, and a fifth peak present in a wavelength region of 610 nm to 660 nm.

12. The apparatus according to claim 1, further comprising a control section configured to control the first and second semiconductor light emitting elements.

13. The apparatus according to claim 12, further comprising:
a first sensor configured to detect temperature of the first surface; and
a second sensor configured to detect temperature of the second surface, wherein
the control section controls, on the basis of outputs from the first and second sensors, amounts of light emitted from the first and second semiconductor light emitting elements to equalize the temperatures of the first and second surfaces.

14. The apparatus according to claim 1, wherein there are a plurality of the first semiconductor light emitting elements on the first surface, there are a plurality of the second semiconductor light emitting elements on the second surface, and the second semiconductor light emitting elements are are aligned with the first semiconductor light emitting elements.

15. The apparatus according to claim 1, wherein an aperture is disposed between the light guiding section and the document glass, and light directed from the light guiding section passes through the aperture before reaching the document glass.

16. The apparatus according to claim 1, wherein the light guiding section includes:
a first reflector opposed to the second surface and configured to reflect the light emitted from the second semiconductor light emitting element; and
a second reflector configured to reflect the light that is reflected by the first reflector toward the document glass.

17. The apparatus according to claim 1, further comprising:
a first mirror configured to reflect light emitted from the first and second semiconductor light emitting elements that has been reflected from the document and to move together with the substrate and the light guiding section; and
a mirror group configured to reflect the light reflected by the first mirror on to the light receiving section and to move in association with the substrate, the light guiding section, and the first mirror.

18. The apparatus according to claim 1, wherein the light emitted from the light guiding section and the light emitted from the first semiconductor light emitting element are each incident on the document glass at a same angle of incidence.

19. An image forming apparatus comprising:
a document glass on which a document is to be placed;
a substrate provided below the document glass and having first and second surfaces that are at an oblique angle with respect to the document glass, the first surface facing the document glass and the second surface opposite the first surface and facing away from the document glass;
a first semiconductor light emitting element disposed on the first surface and configured to emit light in a direction towards the document glass;
a second semiconductor light emitting element disposed on the second surface and configured to emit light in a direction away from the document glass;
a light guiding section configured to receive light emitted from the second semiconductor light emitting element and direct the received light towards the document glass;
a light receiving section configured to receive light emitted from the first and second semiconductor light emitting elements that has been reflected from the document; and
an image forming section configured to form an image of the document based on light received by the light receiving section.

20. The apparatus according to claim 19, wherein
the first semiconductor light emitting element has a spectral distribution in a visible light region with plural first semiconductor peaks, and
the second semiconductor light emitting element has a spectral distribution in a visible light region with a second semiconductor peak that is shifted from the first semiconductor peaks.

* * * * *